United States Patent
Kubik et al.

(10) Patent No.: US 6,611,915 B1
(45) Date of Patent: Aug. 26, 2003

(54) SELECTIVE LOADING OF CLIENT OPERATING SYSTEM IN A COMPUTER NETWORK

(75) Inventors: Joseph Kubik, Austin, TX (US); Michael Joseph Sullivan, Austin, TX (US); Jonathan Mark Wagner, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/321,786

(22) Filed: May 27, 1999

(51) Int. Cl.[7] .............................................. G06F 15/177
(52) U.S. Cl. ............................. 713/200; 707/1; 707/10; 707/104.1; 707/203; 707/205; 707/206; 709/203; 709/219; 709/220; 709/225; 709/228; 709/217; 713/201
(58) Field of Search ................................ 713/200, 201; 707/1, 10, 104.1, 203, 205, 206; 709/203, 219, 220, 225, 228, 217

(56) References Cited

U.S. PATENT DOCUMENTS

| | | | |
|---|---|---|---|
| 5,109,484 A | | 4/1992 | Hughes et al. ............... 395/200 |
| 5,353,410 A | | 10/1994 | Macon, Jr. et al. .......... 395/275 |
| 5,421,009 A | | 5/1995 | Platt ............................. 395/600 |
| 5,485,609 A | | 1/1996 | Vitter et al. ................. 395/600 |
| 5,577,210 A | | 11/1996 | Abdous et al. ........... 395/200.1 |
| 5,581,753 A | | 12/1996 | Terry et al. ................. 395/617 |
| 5,889,942 A | * | 3/1999 | Orenshteyn ................. 713/201 |
| 6,189,100 B1 | * | 2/2001 | Barr et al. ................... 713/182 |
| 6,401,093 B1 | * | 6/2002 | Anand et al. ................. 707/10 |
| 6,438,578 B1 | * | 8/2002 | Schmid et al. .............. 709/203 |
| 6,519,633 B1 | * | 2/2003 | Kubik et al. ................ 709/220 |

* cited by examiner

Primary Examiner—Ly V. Hua
(74) Attorney, Agent, or Firm—David A. Mims, Jr.; Bracewell & Patterson, L.L.P.

(57) ABSTRACT

A client station on computer network uses an operating system such as JavaOS which is permanently stored at the server rather than on storage media at the client location. JavaOS is loaded and installed at the client upon bootup of the client. The JavaOS is loaded and installed at the client upon bootup of the client. Once the basic system is booted using local firmware, and the base file systems on the network are enabled, an application can begin running, and when it needs to use a particular class file a request will be made through the file system and will be routed over to a generic file system driver, on the client, which will then determine, using a set of configured information, where this class exists; it will utilize the particular file systems available on to that booted client, whether it be NFS, or TFTP, to determine where the server is and how to retrieve that particular class file. It will go ahead and force that operation to occur and the class file will be retrieved and cached locally on the client to be used by the application. In order to avoid loading unneeded or lesser-used parts of the JavaOS from the server to the client memory at boot time, groups of classes are broken out of the monolithic image of JavaOS, as part of the Java service loader model (JSL). JSL-provided packages allow an URL prefix to be provided as part of a package's configuration information. When a class method/ data is requested by the loader via the filesystem, if it is not already present, the URL prefix is used to lazily retrieve and cache that file in memory. This allows classes and data files to be delivered as needed, and significantly reduces the amount of data to be retrieved by TFTP by the client at boot time.

12 Claims, 4 Drawing Sheets

| File System | Prefix | Initialization |
|---|---|---|
| ROM | /ROM | static |
| System (Java Service Loader) | /SYSTEM | static |
| NFS | /HOME (or no prefix) | dynamic ifs |
| TFTP | /FONTS | dynamic ifs |

Fig. 2

SELECTIVE LOADING OF CLIENT OPERATING SYSTEM IN A COMPUTER NETWORK

BACKGROUND OF THE INVENTION

1. Technical Field

This invention relates to computer systems and networks, and more particularly to a method of selectively loading a network operating system to a client from a server on a network such as the internet.

2. Description of the Related Art

A client computer on a network may in some instances be in the form of a minimally-configured platform having only the basic components needed to input and output data by a user. All of the applications software and long-term storage of data is provided by a server somewhere else on the network. This type of client station is sometimes called a network computer, in that it is operable only when connected to the network rather than as a stand-alone unit. The client station often does not have permanent storage media such as a hard disk drive or a CD-ROM drive, but instead merely accesses any needed programs and data from a remote server via the network.

In addition to relying on the server and the network for applications programs and for long-term data storage, the client station may also rely on the network link for its operating system. JavaOS™ is an example of such an arrangement. JavaOS is an operating system maintained at a server on a network for downloading by a client each time the client comes online at bootup. The client station contains in its hardware a minimumally-sufficient ROM-based code to attach to the network at power-on and begin to retrieve information from the server; this client immediately starts installing its operating system into local memory upon boot-up as the code is received from the server. Then, after the operating system software is installed, the applications programs needed are retrieved from the server and installed in system memory.

The client station using a JavaOS server-provided operating system or the like has ROM-based code to start loading its operating system from the server, such as by TFTP, at start-up. The JavaOS operating system is a large image, and loading all of the image at one time causes excessive network traffic that may result in boot time delays. The JavaOS as supplied by Sun in the form of one of the releases of JDK or Java Development Kit also contains a large number of classes that are rarely used. The reason these classes are rarely used may be because they provide support for devices or applications that do not exist on the client's platform. Or, they may not be used because they are not part of the general working set (e.g., they are exception or debug classes). In any event loading all of the classes which are not used or rarely used occupies RAM memory in a client system not having a local hard disk and thus not capable of swapping.

In addition, loading all of the classes of JavaOS at boot-up of a client uses network bandwidth. In a network environment where 100 clients are coming on-line at about 8 AM on a workday, and each has to load say ten or twenty Megabytes of JavaOS, there will be network delays, and each machine will appear slow to the user in coming online.

SUMMARY OF THE INVENTION

It is therefore one object of the present invention to provide an improved method of operating a client in a computer network system in a more efficient manner, whereby parts of an operating system are not installed until necessary.

It is another object of the present invention to provide an improved and more efficient method of loading an operating system at a client in a computer network.

It is yet another object of the present invention to provide an improved way of providing an operating system in separately loadable packages which may be loaded by a client as needed.

The above as well as additional objects, features, and advantages of the present invention will become apparent in the following detailed written description.

According to one embodiment of the invention, a client station on a computer network uses an operating system such as JavaOS which is permanently stored at the server rather than on storage media at the client location. The JavaOS is loaded and installed at the client upon bootup of the client. Once the basic system is booted using local firmware, and the base file systems on the network are enabled, an application can begin running, and when it needs to use a particular class file a request will be made through the file system and will be routed over to a generic file system driver, on the client, which will then determine, using a set of configured information, where this class exists; it will utilize the particular file systems available on that booted client, whether it be NFS, or TFTP, to determine where the server is and how to retrieve that particular class file. It will go ahead and force that operation to occur and the class file will be retrieved and cached locally on the client to be used by the application. In order to avoid loading all of the parts of the JavaOS from the server to the client memory, groups of classes are broken out of the monolithic image of JavaOS, and packaged on the server. JDDM-provided packages allow an URL prefix to be provided as part of a package's configuration information. When a class method/data is requested by the loader via the filesystem, if it is not already present, the URL prefix is used to lazily retrieve and cache that file in memory. This allows classes and data files to be delivered as needed, and significantly reduces the amount of data to be retrieved by TFTP by the client at boot time.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment, when read in conjunction with the accompanying drawings, wherein:

FIG. 2 is Table of characteristics of file system used in the system of FIG. 1, according to one embodiment of the invention;

DETAILED DESCRIPTION OF PREFERRED EMBODIMENT

Figure 1:
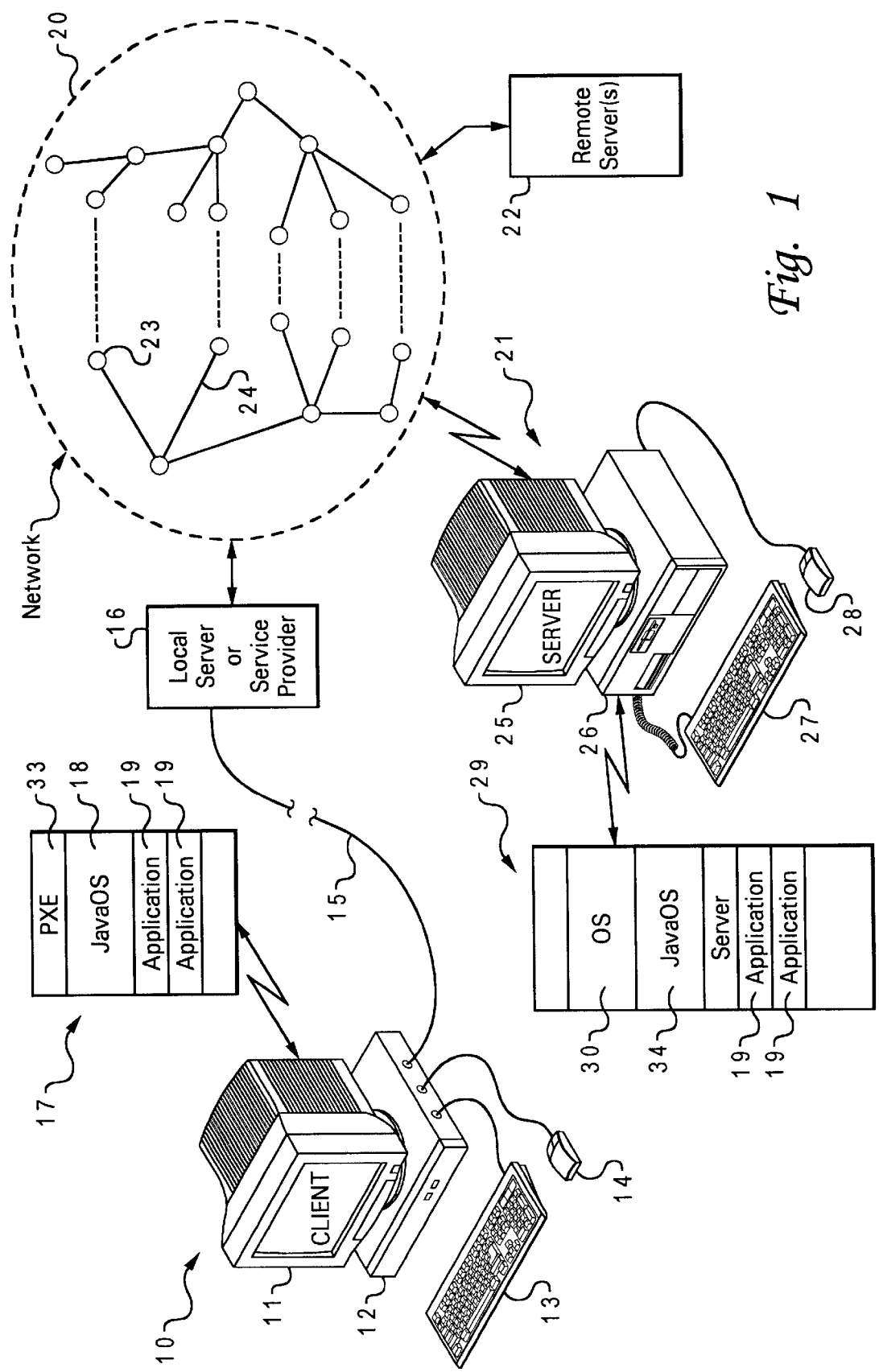
FIG. 1 is an electrical diagram in block form of a computer network which may use features of the present invention.

Referring to FIG. 1, a network system is shown in which concepts of the invention may be used. A client computer station 10 is employed by the user to perform local tasks as well as to obtain information from a network such as the internet. The client station 10 in this case often includes minimal hardware and software, such as a monitor 11, a small system unit 12, a keyboard 13, and a mouse 14. The system unit contains a CPU and system memory, and an adapter card or modem for connection to a network, but often no hard disk or other local persistent storage media. For example, the station 10 may be connected by a modem and a phone line 15, or by a cable, to an internet or intranet server 16 or service provider. The local system memory 17 for the client 10 must contain at least certain classes of an operating system 18, e.g., JavaOS, including code for accessing the network, such as a TCP/IP stack, which was downloaded from a remote server after the client station 10 was booted up. In addition, the memory 17 includes various applications programs 19 for doing the required tasks. For example, the applications programs typically include a wordprocessor, a spreadsheet, as well as perhaps an HTTP-compliant web browser, and an email client which supports simple mail-transfer protocol (SMTP) used for e-mail. These various applications programs 19 are also loaded via the network link from a remote server, as needed, after the station 10 is booted. All of the software including the operating system and applications programs must remain in main memory or RAM at the client because there is usually no hard disk to implement swapping.

The client 10 is part of a network. The interface server 16 or service provider is connected to the internet 20, or network of this type. Thus, the client station 10 is able to send and receive messages to and from other stations on the network 20, and to retrieve information from the network or internet 20, using standard internet connections and applications software.

The internet 20 allows the user at client station 10 to link with other servers and networks such as servers 21 and 22 to retrieve data and programs. The term internet refers to the collection of networks and gateways 23 and 24 that utilize the TCP/IP suite of protocols. TCP/IP is an acronym for "Transport Control Protocol/Interface Program," a software protocol for communication between computers. The internet 20 is a system of geographically distributed computer networks interconnected by computers executing networking protocols allowing users to interact and share information over the networks. The internet has evolved as an "open" system for which developers can design software applications for performing specialized operations or services, essentially without restriction.

The server 21 in this example has a monitor 25, a system unit 26, a keyboard 27, and a mouse 28. The system unit 26 contains a CPU and system memory, and an adapter card or modem for connection to the network 20, and server-level storage such as hard disk drives, CD-ROM, and other persistent storage media, local or remote. The system memory map 29 for the server 21, which in this case represents virtual memory, i.e., physical memory and disk storage, contains an operating system 30 for the server, and a copy of the client operating system, JavaOS, which is to be downloaded from this remote server when the client station 10 is booted up. In addition, the memory 29 includes applications programs used by the server, as well as copies of the applications programs 19 for sending to the client stations. The server software is of course capable of accessing the network, such as by an HTTP-compliant web server as well as function as an email server which supports SMTP.

The client 10 contains code 33 in local memory that is loaded from local ROM upon boot-up, before the operating system 18 is obtained from the server. The code 33 allows the client 10 to operate as a network station at a minimum level so that the operating system and network browser can be downloaded.

Thus, the client station 10 using a JavaOS server-provided operating system 19 or the like has ROM-based code 33 to start loading its operating system from the server 21, using a communication protocol such as TFTP, at start-up. The JavaOS operating system 34 as available at the server is a large image, and loading all of the image at one time into local memory 17 causes network traffic and boot problems. The JavaOS 34 also contains a large number of classes that are rarely used. The reason these classes are rarely used may be because they provide support for devices or applications 19 that do not exist on the client's platform 10. Or, they may not be used because they are not part of the general working set (e.g., exception or debug classes). In any event loading from the server 21 all of the classes of JavaOS 34 which are not used or rarely used occupies RAM memory 17 in the client system 10 which does not have a local hard disk and thus is not capable of swapping; in addition, network bandwidth is unnecessarily used. The unused code would merely occupy space in memory 17 that is needed for other tasks.

In order to avoid loading parts of the JavaOS 34 from the server 21 to the memory 17 of the client 10, according to the invention, groups of classes are broken out of the monolithic image of JavaOS 34, as part of the Java service loader model (JSL), they may be provided as separately loadable Zip files; this method is a first step. In addition, according to the invention, JDDM-provided packages allow an URL prefix to be provided as part of a package's configuration information. When a class method/data is requested by the loader via the filesystem, if it is not already present, the URL prefix is used to lazily retrieve and cache that file in memory 17. This allows classes and data files to be delivered as needed, and significantly reduces the amount of data to be retrieved by TFTP by the client 10 at boot time.

A part of the JavaOS is the Automounter which provides the capability to mount remote file systems using information contained in Java System Database (JSD) business card entries. There is a set of Business Cards that are available from a server, and when a client boots up it gathers this list of business cards; what each business card represents is a set of services that this client machine is able to load if it determines they are needed. If a client loaded a business card that identified a service (needed by one of the client's applications) which is retrieved using a certain file system driver, like one of the drivers 48–50 as will be described below in reference to FIG. 3, what it would do first load the certain file system driver which would be plugged in like drivers 48–50 and then it would use that to get the files that the application needed. The Automount does this mounting of remote file systems by defining a consistent set of configuration and runtime services. The framework that comprises the Automounter framework is called the Generic File System 47. Installable file systems, such as NFS and TFTP, register their services with the Generic File System framework 47 during the creation of each mount point. The Automount framework replaces the functionality provided by the djavaos.homedir and djavaos.mountlst parameters previously provided by DHCP.

The Generic File System component 47 provides Java applications and JavaOS system components access to local and remote file systems. File systems can be dynamically added to the system, or may be part of the static boot image. Files are opened on a particular file system by supplying a prefix on the file name. For example, the following code snippet opens a file in the /SYSTEM file system:

java.lang.String name="/mydir/myfile";
    java.io.FileOutputStream fos=new FileOutputStream ("/SYSTEM"+name);

This request to open the file is routed to the appropriate file system support code by the Generic File System component. Further requests to access the file are also routed to the correct file system.

The file system routing mechanism is supported by native "C" code in the kernel. Support for loading and mounting a new file system is provided in Java, so that new file systems may be added without recompiling the kernel. The following code is an example of mounting a new file system:

```
try {
    new GenericFileSystem("sun.javaos.net.TftpFileSystem",
                                      this, "dynamic", prefix);
} catch (Exception e) {
    System.err.println("TftpFileSystem: failed to instantiate GFS");
```

The class specified as supporting the new file system ("sun.javaos.net.TftpFileSystem" in the above example) must implement a set of well known methods in order for the Generic File System to route requests. These methods are described in the following paragraphs.

The table of FIG. 2 lists the available file systems, their selection prefix (mount point), and initialization time. Other mount points may be added by business cards for the installable file systems.

Figure 3:
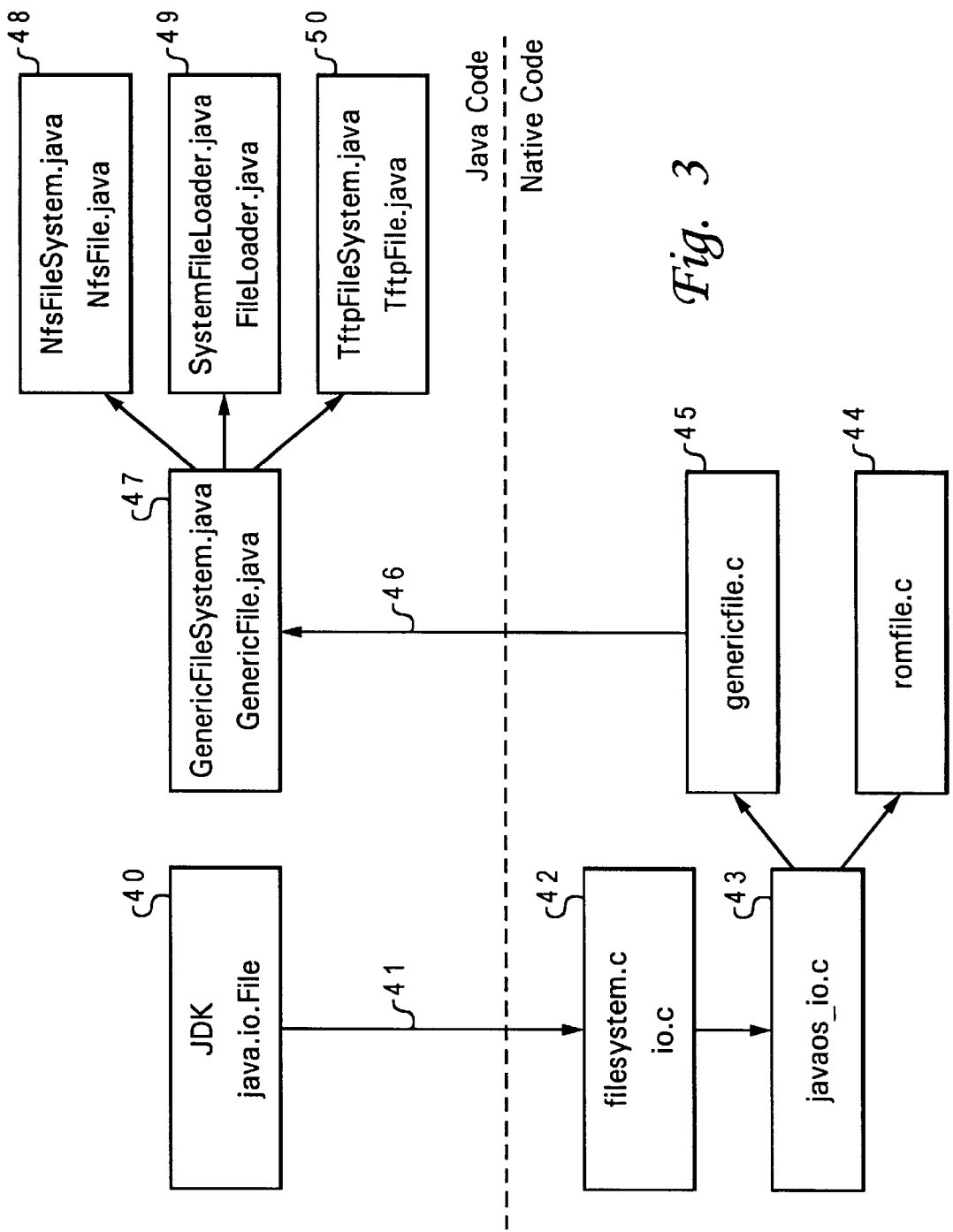
FIG. 3 is a diagram of the modules of the generic file system and interaction or flow, in the system of FIG. 1.

The diagram of FIG. 3 illustrates the modules of the generic file system and their interaction. The arrows in FIG. 3 indicate the general flow of control during access to a file or file system. The java.io.File 40, java.io.FileInputStream, and java.io.FileOutput Stream API in the JDK (in Java code) call via line 41 native methods 42 such as filesystem.c or io.c in native code to route file access requests to the kernel. The java_io.c module 43 parses the prefix and routes the requests either to the internal ROM file system 44, or to the generic file module 45. The request is then routed via line 46 to the GenericFileSystem or GenericFile class, block 47, which forwards it on the appropriate file system handler NFS 48, SYSTEM 49, or TFTP 50. Providing the file system handler switch in Java code rather than native code allows file systems to be dynamically added to a running system.

Static file systems such as ROM and SYSTEM of FIG. 2 are created during the kernel initialization and cannot be terminated. Dynamic file systems NFS and TFTP 48 and 50 are created, and terminated, by code running in the JVM (Java virtual machine). Note that the Generic File System 47 only provides routing of file system requests. All implementation (including file locking) is the responsibility of each file system.

Figure 4:
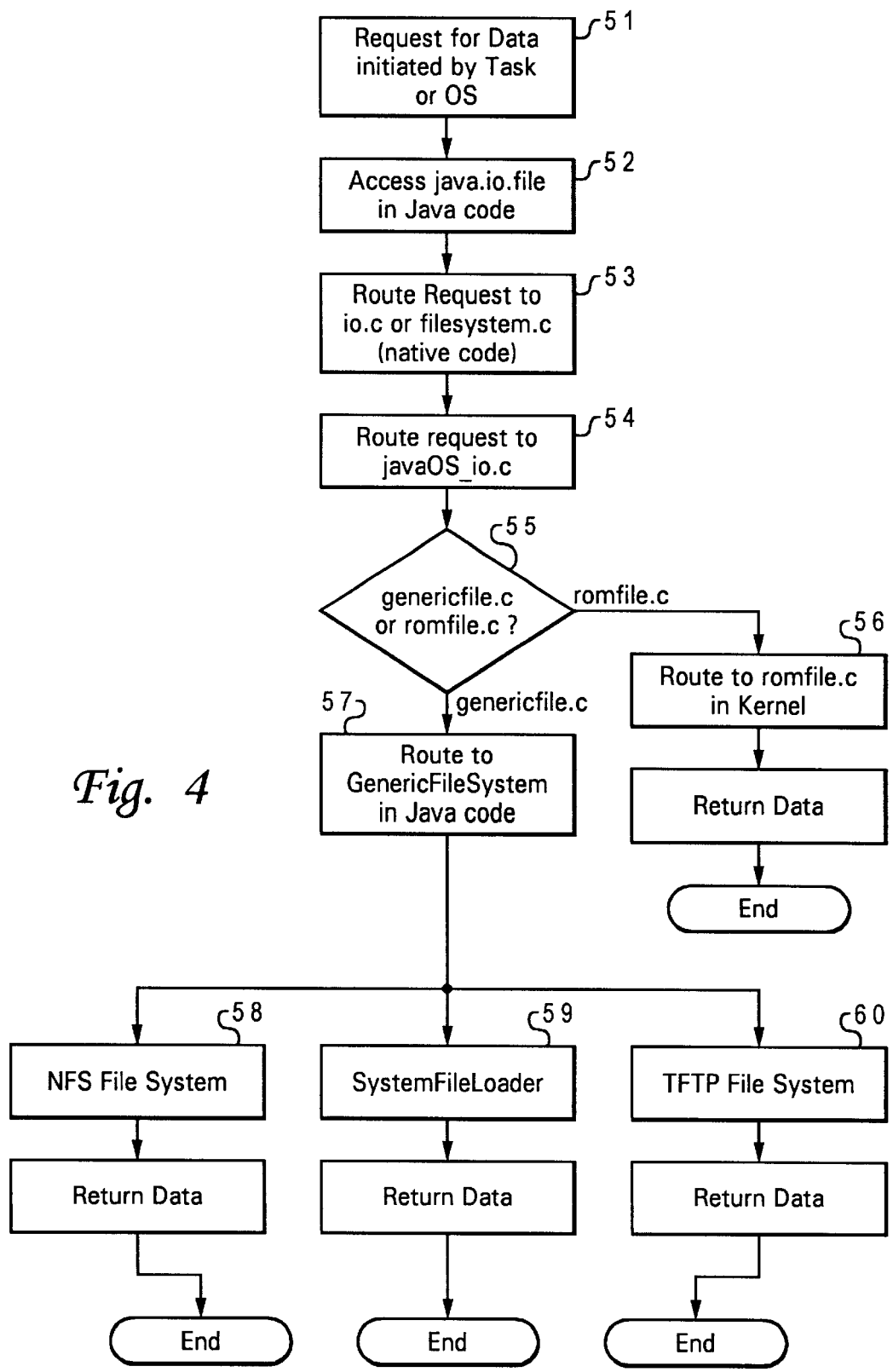
FIG. 4 is a flow chart of the method of accessing file systems in the system of FIGS. 1–3.

Referring to FIG. 4 a flow chart of the method of accessing file system data in the system of FIGS. 1–3 is illustrated, in particular using the modules of the generic file system of FIG. 3. During access to a file or file system, a request is made by a task or the OS, as indicated by block 51. This request goes to the java.io.File module 40 which is in Java code, indicated by block 52. The java.io.File module 40 passes the request to the filesystem.c and io.c, which is in native code, i.e., the kernel, whether it is a file or an I/O request, indicated by block 53. The filesystem.c or io.c in native code routes the file access requests to the kernel, block 53. The java_io.c module 43 parses the prefix and routes the requests either to the internal ROM file system 44, or to the generic file module 45, as indicated by block 54. The request is then routed as indicated by blocks 55, 56 and 57 to either the romfile.c 44 in the kernel or to GenericFileSystem or GenericFile class 47 in Java code. The GenericFileSystem.java in Java code then forwards the request on to the appropriate file system handler NFS 48, SYSTEM 49, or TFTP 50 as indicated by blocks 58, 59 and 60. Providing the file system handler switch in Java code rather than native code allows file systems to be dynamically added to a running system.

An instance of each installable files system (such as NFS or TFTP) is created by the Java Service Loader (JSL) for each mount business card entry present in the JSD. The business card entry contains the IFS specific information required to perform the mount. Once the instance of the IFS has attached to the remote server 21, the IFS registers the mount with the Generic File System, enabling JDK file operations to the mount point. Example NFS business card information:

bundleInstanceInfo=HomeDirectory, sun.javaos.NfsFileSystem.NfsFileSystem
    loadsWhenDiscovered=true
    mount_Path=servername:/directory
    mount_name=/HOME
    protocol_type=UDP
    mount_early =true
    isBusinessCard=true Certain public methods/APIs are of interest. Interfaces are exported to the JDK. The APIs listed in Table I are exported for use by the native "C" code. Entry points are exported from the file javaos_io.c 43 through the header sys_api.h. The API is similar to a standard "C" run-time library file access API.

While the invention has been shown and described with reference to a particular embodiment, it will be understood that various changes in form and detail of the preferred embodiment, as well as other embodiments of the invention, may be made by those skilled in the art without departing from the true spirit and scope of the invention.

TABLE I int sysAccess (const char* pFile, int perm)
    Determines if file can be accessed. Returns 0 if can access, −1 otherwise.
int sysStat(const char* path, struct stat *sbuf)
    Gets file status. Returns 0 if can stat the file, −1 otherwise.
int sysOpen(const char* name, int openMode, int filePerm)
    Opens a file. Returns the file description index if success-, ful −1 otherwise.
int sysClose(int fd)
    Closes a file. Returns 0 if closed, −1 otherwise.
long sysSeek(int fd, long offset, int whence)
    Seeks a file. Returns the new file position or −1 if can't seek.
int sysAvailable(int fd, long* bytes)
    Returns 1 if *bytes set to the number of bytes available, 0 on error.
size_t sysRead(int fd, void *buf, unsigned int nBytes)
    Reads from a file. Returns the number of bytes read, or −1 on error.
size_t sysWrite(int fd, const void *buf, unsigned int nBytes)
    Writes to a file. Returns the number of bytes written, or −1 on error.
int sysRename(const char* srcName, const char* dstName)
    Renames a file. File cannot be renamed across file systems.
    Returns 0 on success, −1 on error.

TABLE I-continued

```
    int sysUnlink(const char* file)
        Removes file. Returns 0 on success, −1 on error.
    int sysMkdir(const char* path, int mode)
        Makes a directory. Returns 0 on success, −1 on error.
    int sysRmdir(const char* path)
        Removes a directory. Directory must be empty.
        Returns 0 on success, −1 on error.
    DIR* sysOpenDir(const char* path)
        Opens a directory. Returns pointer to DIR struct on
        success, or NULL
if error.
    int sysCloseDir(DIR* dp)
        Closes a directory. Returns 0 on success, −1 on error.
    struct dirent* sysReadDir(DIR* dp)
        Returns directory entry on success, NULL otherwise.
    int mount_fs(char* prefix, pathops *ops, unsigned fsid)
        Mounts a file system. Returns 0 on success, −1 on error.
        Internal - called be genericfile.c
    int unmount_fs(char* prefix)
        Unmounts a file system. Returns 1 on success, 0 on error.
        Internal - called be genericfile.c
    void init_file_systems ()
        Mounts static file systems.
        Called by javai.c during startup.
```

What is claimed is:

1. A method of loading and installing an operating system at a client connected to a network, comprising the steps of:

at said server, separating said operating system into parts, including a first main part and at least one other part, and assigning each of parts a different identification;

at said client, retrieving and installing said first part of said operating system by requesting said first part to be loaded from said server using a generic file system driver via said network using a first identification; and at said client, after said first part has been retrieved and installed, then retrieving and installing said at least one other part of said operating system by sending a request to said server via said network using a second identification.

2. A method according to claim 1 wherein said identification of said first part is a URL prefix, and said URL prefix is used in a request to retrieve said first part from said server.

3. A method according to claim 2 wherein said identification of said at least one other part is a URL prefix, and said URL prefix is used by said client in said request to retrieve said at least one other part from said server.

4. A method according to claim 3 wherein said first part of said operating system is loaded from said server upon boot-up of said client.

5. A method according to claim 4 wherein said operating system is JavaOS.

6. A method according to claim 5 wherein said at least one other part of said operating system is loaded from said server to said client as needed rather than at boot-up of said client.

7. A system for loading and installing an operating system at a client connected to a network, comprising:

said operating system at said server being separated into parts, including a first main part and at least one other part, each of parts being assigned a different identification; at said client, means for retrieving and installing said first part of said operating system by requesting said first part to be loaded from said server via said network using a first identification; and at said client, means for then retrieving and installing said at least one other part of said operating system using a generic file system driver by sending a request to said server via said network using a second identification, after said first part has been retrieved and installed.

8. A system according to claim 7 wherein said identification of said first part is a URL prefix, and said URL prefix is used in a request to retrieve said first part from said server.

9. A system according to claim 8 wherein said identification of said at least one other part is a URL prefix, and said URL prefix is used by said client in said request to retrieve said at least one other part from said server.

10. A system according to claim 9 wherein said operating system is loadable from said server upon boot-up of said client.

11. A system according to claim 10 wherein said operating system is JavaOS.

12. A system according to claim 11 wherein said at least one other part of said operating system is loaded from said server to said client as needed rather than at boot-up of said client.

* * * * *